(12) United States Patent
Ben-Shlomo

(10) Patent No.: US 10,756,786 B1
(45) Date of Patent: Aug. 25, 2020

(54) SYSTEMS AND METHODS FOR PROVIDING ISOLATION FOR ANTENNAS IN A WIRELESS COMMUNICATION SYSTEM

(71) Applicant: Corning Research & Development Corporation, Corning, NY (US)

(72) Inventor: Dror Ben-Shlomo, Reut (IL)

(73) Assignee: Corning Research & Development Corporation, Charlotte, NC (US)

( * ) Notice: Subject to any disclaimer, the term of this patent is extended or adjusted under 35 U.S.C. 154(b) by 0 days.

(21) Appl. No.: 16/399,055

(22) Filed: Apr. 30, 2019

(51) Int. Cl.
    *H04B 7/0413*      (2017.01)
    *H04B 7/08*      (2006.01)
    *H04B 7/06*      (2006.01)

(52) U.S. Cl.
    CPC .......... *H04B 7/0413* (2013.01); *H04B 7/068* (2013.01); *H04B 7/0825* (2013.01)

(58) Field of Classification Search
    CPC ..... H04B 7/0413; H04B 7/0825; H04B 7/068
    USPC ........................................ 375/262
    See application file for complete search history.

(56) References Cited

U.S. PATENT DOCUMENTS

| | | | |
|---|---|---|---|
| 10,326,522 B1* | 6/2019 | Khan | H04L 5/1469 |
| 2015/0195055 A1* | 7/2015 | Ben-Shlomo | H04L 5/1423 370/278 |
| 2016/0065293 A1* | 3/2016 | Tarlazzi | H04B 7/024 375/299 |
| 2018/0054823 A1* | 2/2018 | Stapleton | H04W 36/06 |
| 2018/0278299 A1* | 9/2018 | Morrison | H04L 25/02 |
| 2018/0294858 A1* | 10/2018 | Pehlke | H04B 1/0057 |
| 2019/0068250 A1* | 2/2019 | Kim | H04B 10/2575 |
| 2019/0110304 A1* | 4/2019 | Khan | H04W 16/20 |
| 2019/0140753 A1* | 5/2019 | Katabi | H04L 25/0202 |
| 2019/0166650 A1* | 5/2019 | Stefanik | H04W 88/085 |
| 2019/0238283 A1* | 8/2019 | Liu | H04B 7/0617 |
| 2019/0288736 A1* | 9/2019 | Bai | H04B 1/006 |

* cited by examiner

*Primary Examiner* — Hirdepal Singh
(74) *Attorney, Agent, or Firm* — C. Keith Montgomery

(57) ABSTRACT

Isolation for antennas in a wireless communication system is achieved between transmit and receive paths for a multiple input multiple output (MIMO) antenna array by separating a first transmit path from an associated receive path to be matched with a second transmit path and matching the first receive path with the second receive path. It is expected that the two transmit paths operate on sufficiently different frequencies that there is minimal interference there and the additional spacing from the transmit path to the receive path will reduce interference therebetween without increasing a footprint of the antenna array.

21 Claims, 12 Drawing Sheets

SYSTEMS AND METHODS FOR PROVIDING ISOLATION FOR ANTENNAS IN A WIRELESS COMMUNICATION SYSTEM

BACKGROUND

The technology of the disclosure relates to improving isolation between uplink and downlink channels at a wireless transceiver.

Wireless communication is rapidly growing, with ever-increasing demands for high-speed mobile voice and data communication. Information is embedded in an electromagnetic signal generally within the radio frequency range of the electromagnetic spectrum. This electromagnetic signal is transmitted from a transmitter, through a first antenna, across any intervening space, to a second receiver through a second antenna. In many instances the transmitter is actually a first transceiver and the receiver is actually a second transceiver and signals are exchanged bi-directionally. Depending on point of view, one such signal may be considered an uplink signal, and the other signal may be considered a downlink signal.

In the early days of wireless communication there was generally perceived to be ample room within the electromagnetic spectrum for many such signals to coexist without interference between signals. As the complexity of the signals has increased, in part due to the increasing amounts of information placed into the signals, the electromagnetic spectrum has become relatively crowded, particularly in the radio frequency range. Accordingly, uplink signals are typically relatively close in frequency to downlink signals for bi-directional communication.

To help isolate uplink signals from downlink signals at a transceiver, there are currently a variety of solutions. One such solution is a time-based approach (e.g., time division multiplexing) that prevents simultaneous use of uplink frequencies and downlink frequencies. While effective, this approach has fallen out of favor as more information is sent in each direction making simultaneous use of the frequencies almost a requirement. Another solution is the use of a duplexer that provides isolation between uplink and downlink frequencies. An exemplary conventional transceiver 100 using a duplexer is illustrated in FIG. 1.

In particular, the transceiver 100 includes a transmit (Tx) path 102 where a signal 104 to be transmitted enters a field programmable gate array (FPGA) circuit 106 for processing and is passed through a digital-to-analog converter (DAC) 108 and an amplifier 110 to a duplexer 112. From the duplexer 112, the converted, amplified signal 104 is passed to an antenna 116 and transmitted. The transceiver 100 further includes a receive (Rx) path 118. Signals are received at the antenna 116, passed through the duplexer 112, through an amplifier 120 and an analog-to-digital (ADC) converter 122 to the FPGA 106 for processing to become a receive signal 124.

At its simplest, a duplexer is a device that allows bi-directional (i.e., duplex) communication over a single path. In the transceiver 100, the duplexer 112 isolates the receiver portion from the transmitter portion while permitting them to share a common antenna. In radio frequency communication, transmit and receive signals typically occupy different frequency bands, and so the duplexer 112 may have frequency selective filters. Modern communication often uses nearby frequency bands, so the frequency separation between transmit and receive signals is relatively small.

While duplexers may be effective at providing desired isolation, as the frequencies get closer and, particularly in the frequencies of interest, the cost of such duplexers has increased to levels that are not commercially practical. For example, such elements may cost around sixty to ninety U.S. dollars. For high frequency broadband duplexers, that cost may readily exceed one hundred U.S. dollars, and in some cases exceed three hundred U.S. dollars. Such costs are generally perceived to be unacceptable within most commercial industries.

A third solution is the use of interference cancellation calculations that may be performed in an FPGA circuit cooperating with a multiple input/multiple output (MIMO) antenna array such as illustrated in FIG. 2. In particular, a transceiver 200 may include an FPGA 202 that controls four antennas 204(1)-204(4). Antennas 204(1)-204(2) handle MIMO stream A, and antennas 204(3)-204(4) handle MIMO stream B. For MIMO stream A, the antenna 204(1) acts as the antenna for a transmit path 206(1), and the antenna 204(2) acts as the antenna for a receive path 206(2). The transmit path 206(1) includes a DAC 208 and an amplifier 210. Similarly, the receive path 206(2) has an ADC 212 and an amplifier 214. Further, a tap 216 is associated with the antenna 204(1) and provides a signal to an interference cancelation circuit 218 within the FPGA 202. Likewise, for MIMO stream B, the antenna 204(3) acts as the antenna for a transmit path 220(1), and the antenna 204(4) acts as the antenna for a receive path 220(2). The transmit path 220(1) includes a DAC 222 and an amplifier 224. Similarly, the receive path 220(2) has an ADC 226 and an amplifier 228. Further, a tap 230 is associated with the antenna 204(3) and provides a signal to an interference cancelation circuit 232 within the FPGA 202. The interference cancelation circuits 218 and 232 operate to subtract or otherwise remove the transmit signal from the received signal of the respective paths. This subtraction is done because the signal emanating from the transmit antennas 204(1), 204(3) may be received at the receive antennas 204(2), 204(4). By subtracting such received signals, the original received signal may be restored.

MIMO antenna arrays necessarily physically space antennas from one another to help isolate signals. While effective, as the number of antennas increases, the size penalty that the physical separation requires becomes impractical. This complexity is exacerbated when there is a dual band requirement for the MIMO antenna array, such as may occur in a distributed communication system (e.g., a centralized radio access network (cRAN) or distributed antenna system (DAS)). Such a situation is illustrated in FIG. 3, where a cRAN 300 has a digital routing unit (DRU) 302 coupled to a low band baseband unit (BBU) 304 and a high band BBU 306. Both the low band BBU 304 and the high band BBU 306 handle (at least) two data streams (MIMO A and MIMO B) each having an uplink (UL) and a downlink (DL) component. Thus, for the low band BBU 304, there is data stream DL MIMO A, which goes from the low band BBU 304, through the DRU 302 to a low band section 308(1) of a transceiver system 310. As with the transceiver 200 of FIG. 2, the DL MIMO A goes to an FPGA 312 and is sent through a DAC 314 and an amplifier 316 before transmission from an antenna 318. UL signals are received at an antenna 320, provided to an amplifier 322, converted in an ADC 324, and then provided to the FPGA 312. The UL signals are then passed to the low band BBU 304. Similarly, the DL MIMO B goes to the FPGA 312 and is sent through a DAC 326 and an amplifier 328 before transmission from an antenna 330. UL signals are received at an antenna 332, provided to an amplifier 334, converted in an ADC 336, and then provided to the FPGA 312. The UL signals are then passed to the low band BBU 304. As noted by signals I1 and I2, the signals transmitted from the antenna 318 may impinge on the antennas 320 and 332. Likewise, the signals I3 and I4 from the antenna 330 may impinge on the antennas 320 and 332. To reduce this interference, there is a tap 338 that collects information about the signal being sent from the antenna 318 and a tap 340 that collects information about the signal being sent from the antenna 330. These taps 338 and 340 feed interference cancelation circuits 342 and 344, respectively, which calculate an offset in a fashion similar to the transceiver 200, albeit taking into account both possible interfering signals.

With continued reference to FIG. 3, for the high band BBU 306, the DL MIMO A goes to an FPGA 346 in high band section 308(2) of the transceiver system 310 and is sent through a DAC 348 and an amplifier 350 before transmission from an antenna 352. UL signals are received at an antenna 354, provided to an amplifier 356, converted in an ADC 358, and then provided to the FPGA 346. The UL signals are then passed to the high band BBU 306. Similarly, the DL MIMO B goes to the FPGA 346 and is sent through a DAC 360 and an amplifier 362 before transmission from an antenna 364. UL signals are received at an antenna 366, provided to an amplifier 368, converted in an ADC 370, and then provided to the FPGA 346. The UL signals are then passed to the high band BBU 306. As noted by signals I5 and I6, the signals transmitted from the antenna 352 may impinge on the antennas 354 and 366. Likewise, the signals I7 and I8 from the antenna 364 may impinge on the antennas 354 and 366. To reduce this interference, there is a tap 372 that collects information about the signal being sent from the antenna 352 and a tap 374 that collects information about the signal being sent from the antenna 364. These taps 372 and 374 feed interference cancelation circuits 376 and 378, respectively, which calculate an offset in a fashion similar to the transceiver 200, albeit taking into account both possible interfering signals.

It should be appreciated that the calculations done by the interference cancelation circuits 342, 344, 376, and 378 may become more complex as the MIMO array expands past two bands or more than two antenna pairs. This complexity may add latency or otherwise impact performance and ultimately may become impractical as a solution.

Various industries have wrestled with the problem of signal isolation, but one industry that is seeing heavier use, and thus beginning to direct more attention to this issue, is in, as alluded to in the discussion of FIG. 3, distributed communication systems. An exemplary distributed communication system may be a distributed antenna system (DAS) within a building that provides wireless connections to mobile terminals within the building in places where an outside signal may be blocked or where traffic dictates that a small cell may be appropriate.

One approach to deploying a wireless communication system involves the use of radio frequency (RF) antenna coverage areas, also referred to as "antenna coverage areas." Antenna coverage areas can have a radius in the range from a few meters up to twenty meters as an example. Combining a number of access point devices creates an array of antenna coverage areas. Because the antenna coverage areas each cover small areas, there are typically only a few users (clients) per antenna coverage area. This allows for minimizing the amount of RF bandwidth shared among the wireless system users. It may be desirable to employ optical fiber to distribute communication signals. Benefits of optical fiber include increased bandwidth.

One type of distributed antenna system for creating antenna coverage areas includes distribution of RF communication signals over an electrical conductor medium, such as coaxial cable or twisted pair wiring. Another type of distributed antenna system for creating antenna coverage areas, called "Radio-over-Fiber," or "RoF," utilizes RF communication signals sent over optical fibers. Both types of systems can include head-end equipment coupled to a plurality of remote units (RUs), which may include an antenna and may be referred to as a remote antenna unit or RAU. Each RU provides antenna coverage areas. The RUs can each include RF transceivers coupled to an antenna to transmit RF communication signals wirelessly, wherein the RUs are coupled to the head-end equipment via the communication medium. The RF transceivers in the RUs are transparent to the RF communication signals. The antennas in the RUs also receive RF signals (i.e., electromagnetic radiation) from clients in the antenna coverage area. The RF signals are then sent over the communication medium to the head-end equipment. In optical fiber or RoF distributed antenna systems, the RUs convert incoming optical RF signals from an optical fiber downlink to electrical RF signals via optical-to-electrical (O-E) converters, which are then passed to the RF transceiver. The RUs also convert received electrical RF communication signals from clients via the antennas to optical RF communication signals via electrical-to-optical (E-O) converters. The optical RF signals are then sent over an optical fiber uplink to the head-end equipment.

While some RUs are simple antennas that merely bring an existing cellular-type service into an area with poor reception (e.g., inside large buildings), other RUs may be more robust and may actually act as a fully functional cell (e.g., a picocell, femtocell, microcell, or the like) with registration, hand-off, and other traditional cellular functions. Still other RUs may act as some form of hybrid with some, but not all functions of a traditional cell, but more functionality than a simple antenna.

An exemplary distributed communication system is provided with reference to FIG. 4 to provide additional context. In this regard, FIG. 4 illustrates distribution of communication services to remote coverage areas 400(1)-400(N) of a wireless distribution system (WDS, also referred to herein as a distributed communication system, a distributed antenna system (DAS), or wireless communication system (WCS)) 402, wherein 'N' is the number of remote coverage areas. These communication services can include cellular services, wireless services, such as RF identification (RFID) tracking, Wireless Fidelity (WiFi), local area network (LAN), and wireless LAN (WLAN), wireless solutions (Bluetooth, WiFi Global Positioning System (GPS) signal-based, and others) for location-based services, and combinations thereof, as examples. The remote coverage areas 400(1)-400(N) are created by, and centered on, remote units 404(1)-404(N) (sometimes these may be low power remote units (LPR), but are more commonly referred to herein as just a remote unit (RU) or remote antenna unit (RAU)) connected to a central unit 406 (e.g., a digital routing unit (DRU) a head-end controller, a head-end unit (HEU), or the like). The central unit 406 may be communicatively coupled to a signal source 408, for example, a base transceiver station (BTS) or a baseband unit (BBU). The communicative coupling may be wireless (e.g., such as through a cellular network) or over a wire-based/fiber-based system (e.g., such as through some form of telephony network backbone or the Internet). When the signal source 408 is a BBU, the signal source 408 may communicate with the central unit 406, which may be a DRU, using digital communication protocols such as the common public radio interface (CPRI). In this regard, the central unit 406 receives downlink communication signals 410D from the signal source 408 to be distributed to the remote units 404(1)-404(N). The remote units 404(1)-404(N) are configured to receive the downlink communication signals 410D from the central unit 406 over a communication medium 412 to be distributed to the respective remote coverage areas 400(1)-400(N) of the remote units 404(1)-404(N). In a non-limiting example, the communication medium 412 may be a wired communication medium, a wireless communication medium, or an optical fiber-based communication medium. While wireless is possible, exemplary aspects of the present disclosure are well-suited for situations where the medium is a physical conductor (electrical, optical, or some other waveguide (e.g., a wireless microwave system may still use a microwave waveguide)). Each of the remote units 404(1)-404(N) may include an RF transmitter/receiver (not shown) and a respective antenna 414(1)-414(N) operably connected to the RF transmitter/receiver to distribute wirelessly the communication services to client devices 416 within the respective remote coverage areas 400(1)-400(N). The remote units 404(1)-404(N) are also configured to receive uplink communication signals 410U from the client devices 416 in the respective remote coverage areas 400(1)-400(N) to be distributed to the signal source 408. The size of each of the remote coverage areas 400(1)-400(N) is determined by an amount of RF power transmitted by the respective remote units 404(1)-404(N), receiver sensitivity, antenna gain, and RF environment, as well as by RF transmitter/receiver sensitivity of the client devices 416. The client devices 416 usually have a fixed maximum RF receiver sensitivity, so that the above-mentioned properties of the remote units 404(1)-404(N) mainly determine the size of the respective remote coverage areas 400(1)-400(N).

With reference to FIG. 4, the central unit 406 may include electronic processing devices, for example an FPGA, a digital signal processor (DSP), and/or a central processing unit (CPU), for processing the downlink communication signals 410D and the uplink communication signals 410U. Likewise, each of the remote units 404(1)-404(N) also employs electronic processing devices for processing the downlink communication signals 410D and the uplink communication signals 410U. Further, the communication medium 412 is only able to carry the downlink communication signals 410D and the uplink communication signals 410U up to a maximum bandwidth. Collectively, the processing capabilities of the electronic processing devices in the central unit 406, the processing capabilities of the electronic processing devices in the remote units 404(1)-404(N), and the maximum bandwidth of the communication medium 412 provide the system resources available in the WDS 402. In practice, the remote units 404(1)-404(N) and the client devices 416 may each have a transceiver with frequency isolation concerns.

No admission is made that any reference cited herein constitutes prior art. Applicant expressly reserves the right to challenge the accuracy and pertinency of any cited documents.

SUMMARY OF THE DETAILED DESCRIPTION

Embodiments disclosed in the detailed description provide isolation for antennas in a wireless communication system. Related components, systems, and methods are also disclosed. In embodiments disclosed herein, isolation between transmit and receive paths for a multiple input/multiple output (MIMO) antenna array is improved by separating a first transmit path from an associated receive path to be matched with a second transmit path and matching the first receive path with the second receive path. It is expected that the two transmit paths operate on sufficiently different frequencies such that there is minimal interference there, and the additional spacing from the transmit path to the receive path will reduce interference therebetween without increasing a footprint of the antenna array.

In one exemplary aspect of the disclosure, a distributed communication system is disclosed. The distributed communication system comprises a central unit. The distributed communication system also comprises a first remote unit coupled to the central unit through a first communication medium. The first remote unit comprises a MIMO antenna array. The MIMO antenna array comprises a first transmit antenna configured to transmit a first downlink signal in a first frequency band. The MIMO antenna array also comprises a second transmit antenna configured to transmit a second downlink signal in the first frequency band. The MIMO antenna array also comprises a first receive antenna configured to receive a first uplink signal in a second frequency band different than the first frequency band. The MIMO antenna array also comprises a second receive antenna configured to receive a second uplink signal in the second frequency band. The distributed communication system also comprises a second remote unit coupled to the central unit through a second communication medium.

An additional embodiment of the disclosure relates to a remote unit. The remote unit comprises a MIMO antenna array. The MIMO antenna array comprises a first transmit antenna configured to transmit a first downlink signal in a first frequency band. The MIMO antenna array also comprises a second transmit antenna configured to transmit a second downlink signal in the first frequency band. The MIMO antenna array also comprises a first receive antenna configured to receive a first uplink signal in a second frequency band different than the first frequency band. The MIMO antenna array also comprises a second receive antenna configured to receive a second uplink signal in the second frequency band.

An additional embodiment of the disclosure relates to a method for communicating with wireless mobile terminals through a distributed communication system. The method comprises routing a first downlink signal in a first frequency band to a first remote unit. The method also comprises routing a second downlink signal in a second frequency band to a second remote unit. The method also comprises receiving a first uplink signal in the first frequency band at the second remote unit. The method also comprises receiving a second uplink signal in the second frequency band at the first remote unit.

Additional features and advantages will be set forth in the detailed description which follows, and in part will be readily apparent to those skilled in the art from the description or recognized by practicing the embodiments as described in the written description and the claims hereof, as well as the appended drawings.

It is to be understood that both the foregoing general description and the following detailed description are merely embodiments, and are intended to provide an overview or framework to understand the nature and character of the claims.

The accompanying drawings are included to provide a further understanding, and are incorporated in and constitute a part of this specification. The drawings illustrate one or more embodiment(s), and together with the description, serve to explain principles and operation of the various embodiments.

DETAILED DESCRIPTION

Embodiments disclosed in the detailed description provide isolation for antennas in a wireless communication system. Related components, systems, and methods are also disclosed. In embodiments disclosed herein, isolation between transmit and receive paths for a multiple input/multiple output (MIMO) antenna array is improved by separating a first transmit path from an associated receive path to be matched with a second transmit path and matching the first receive path with the second receive path. It is expected that the two transmit paths operate on sufficiently different frequencies such that there is minimal interference there, and the additional spacing from the transmit path to the receive path will reduce interference therebetween without increasing a footprint of the antenna array.

While it should be appreciated that uplink and downlink are relativistic terms, for the purposes of the present disclosure, a downlink path is considered to be the transmission path and an uplink path is considered to be the receive path. The terms downlink/transmit path are used interchangeably as are the terms uplink/receive path.

Thus, exemplary aspects of the present disclosure physically interleave the downlink paths in a first band with the uplink paths of a second band such that uplink and downlinks of the same band and same stream are physically separated from one another by sufficient distance to reduce possible interference to acceptable levels.

Figure 1:
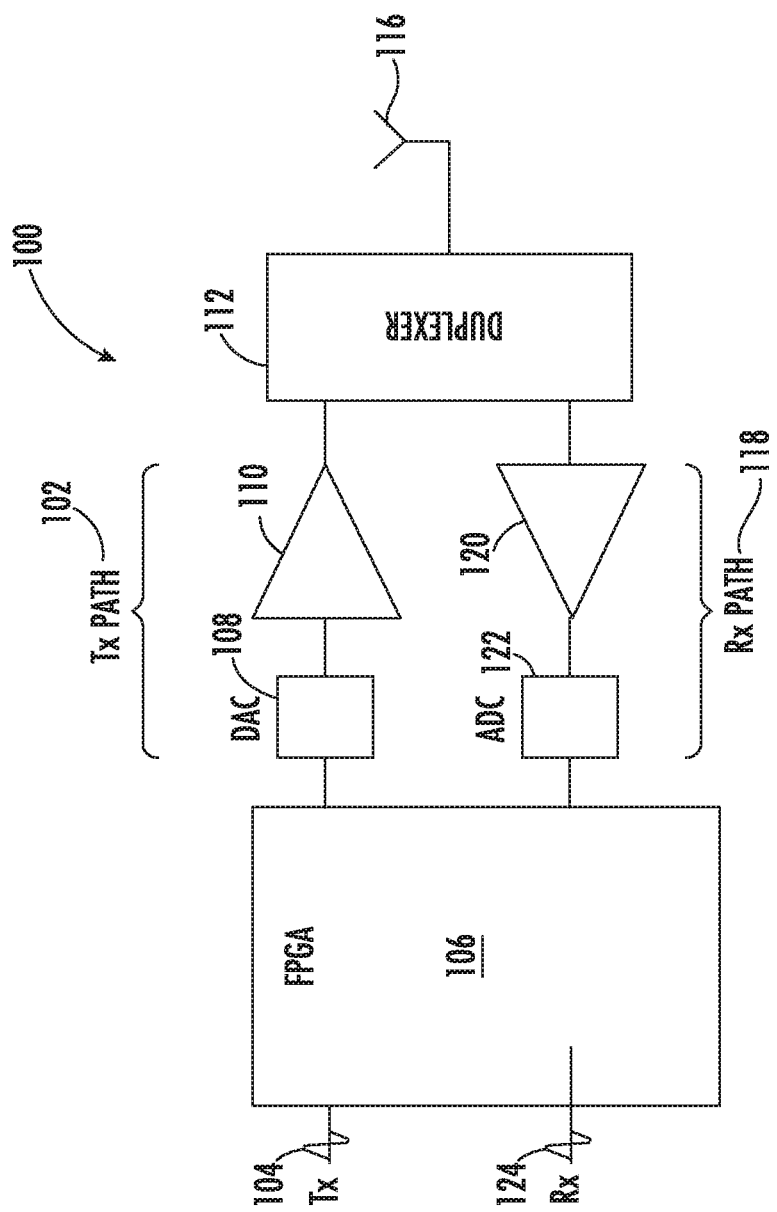
FIG. 1 is a schematic diagram of an exemplary transceiver using a duplexer to separate transmit and receive paths.
Figure 2:
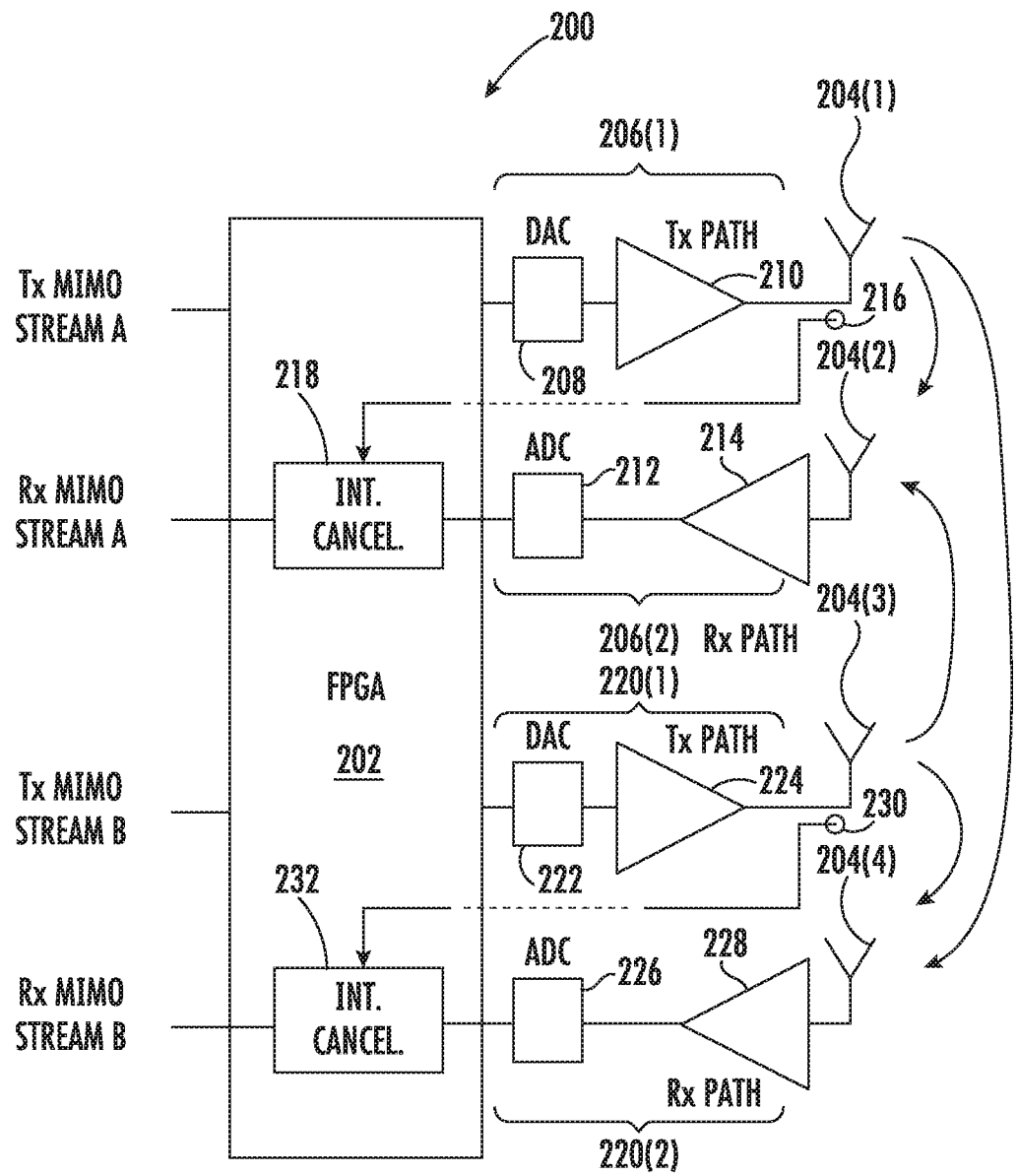
FIG. 2 is a schematic diagram of an exemplary transceiver using interference cancelation in a multiple input/multiple output (MIMO) antenna array to separate transmit and receive paths.
Figure 3:
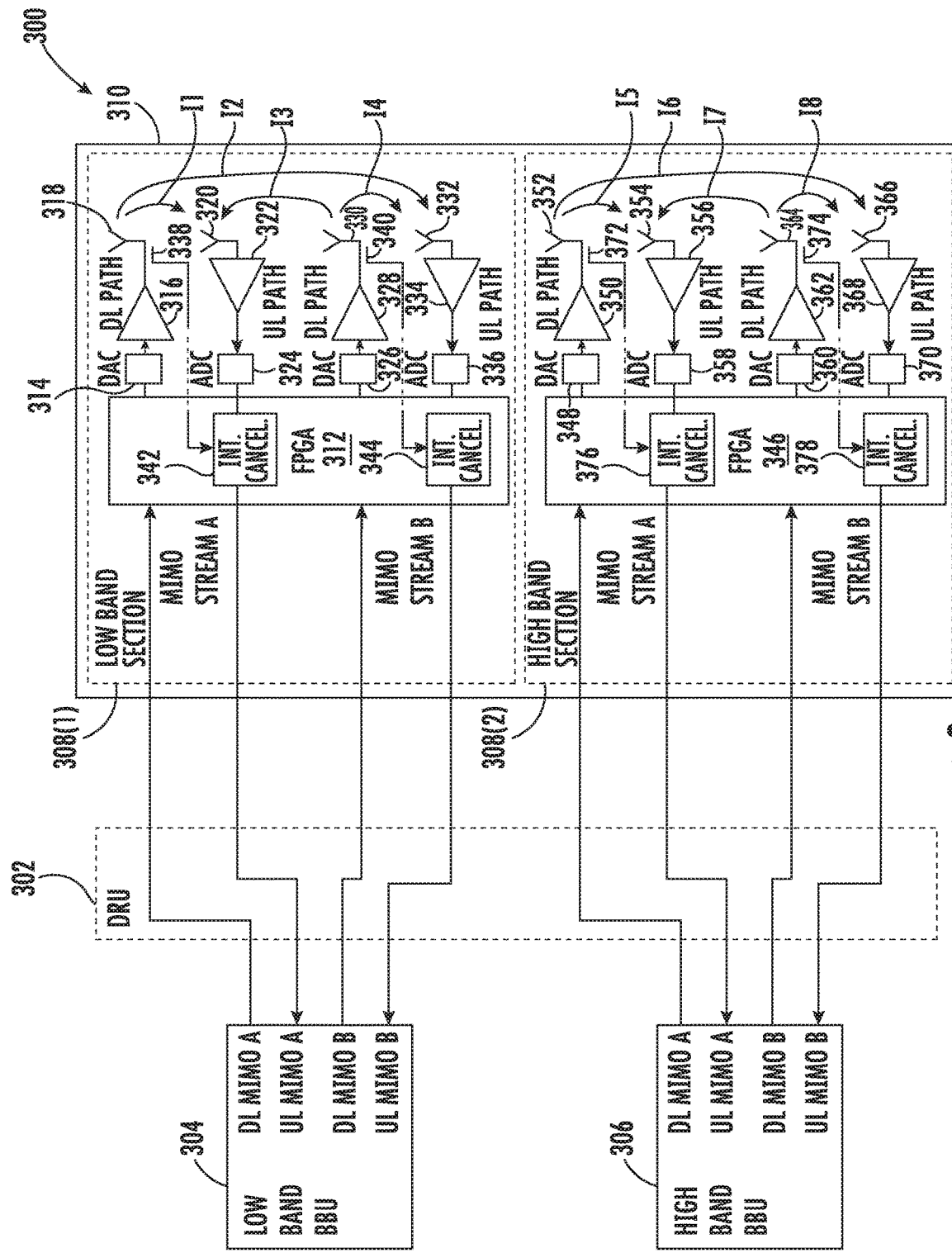
FIG. 3 is a schematic diagram of an exemplary dual-band transceiver using interference cancelation in a MIMO antenna array to separate transmit and receive paths.
Figure 4:
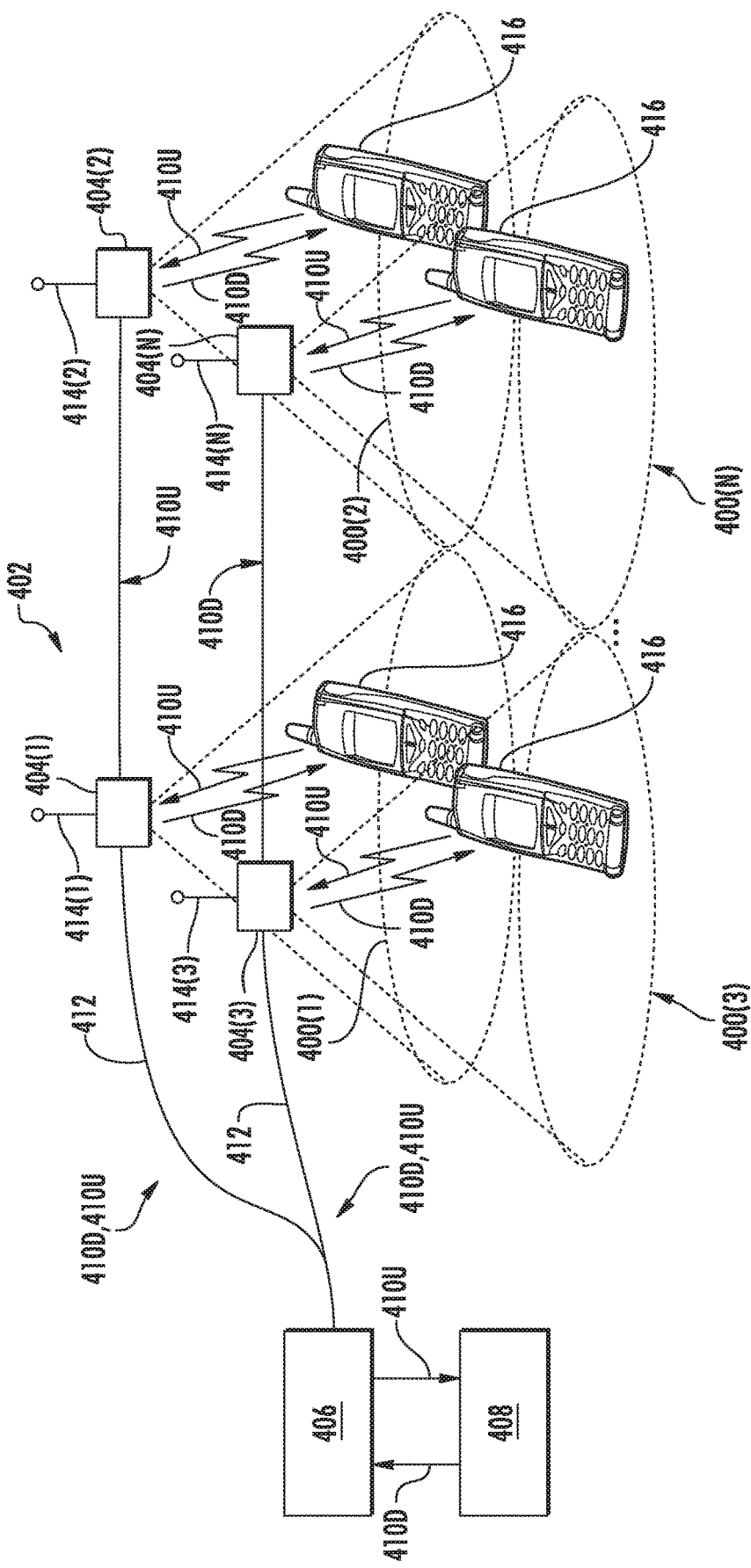
FIG. 4 is a simplified diagram showing a distributed communication system that may include transceivers such as the transceivers illustrated in FIGS. 1-3.
Figure 5:
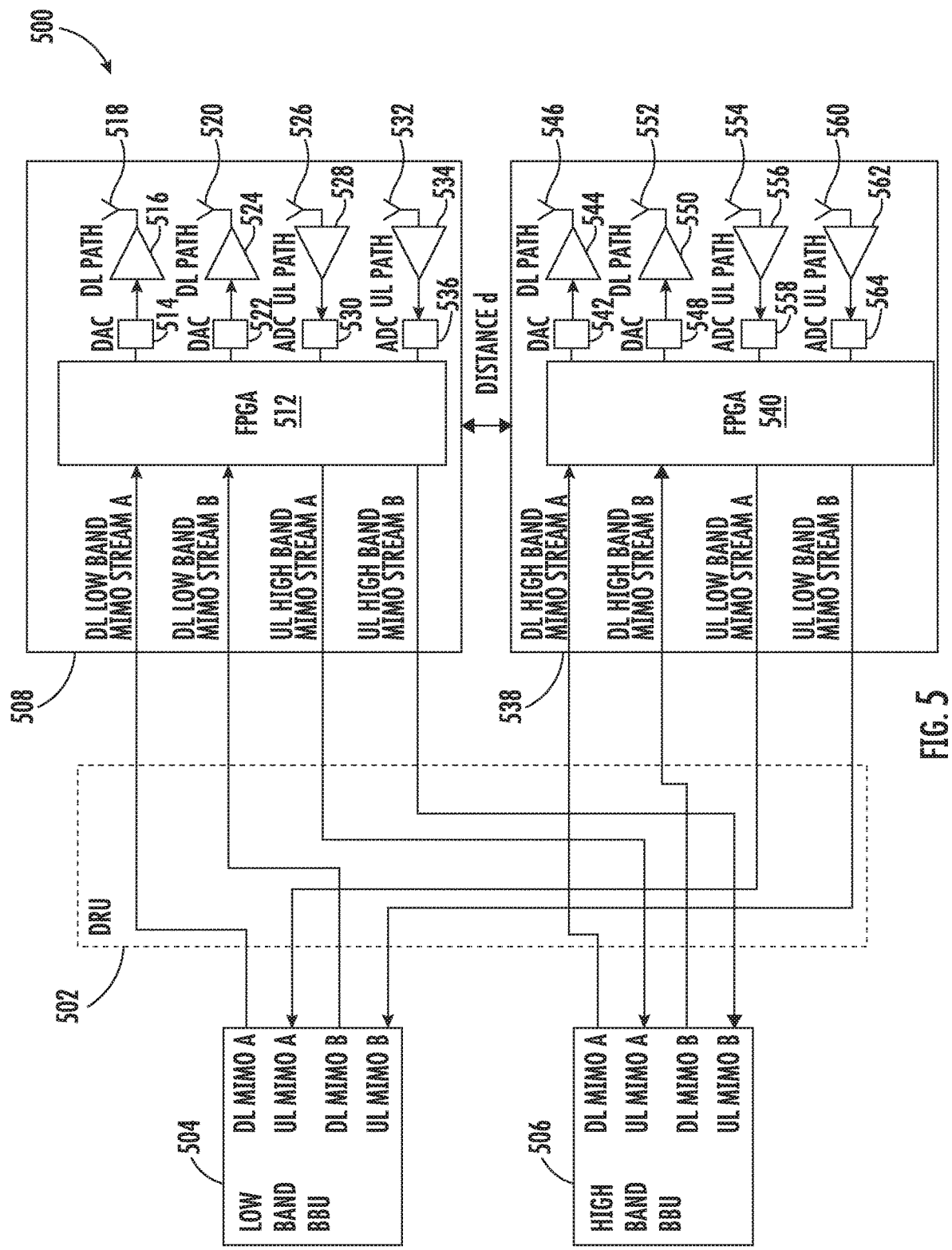
FIG. 5 is a schematic diagram showing a dual-band transceiver able to separate transmit and receive paths without the use of a duplexer or interference cancelation according to an exemplary aspect of the present disclosure.

In this regard, FIG. 5 illustrates a centralized radio access network (cRAN) 500 that has a digital routing unit (DRU) 502 coupled to a low band baseband unit (BBU) 504 that operates in a first frequency band and a high band BBU 506 that operates in a second frequency band higher than the first frequency band. Both the low band BBU 504 and the high band BBU 506 handle (at least) two data streams (MIMO A and MIMO B) each having an uplink (UL) and a downlink (DL) component. Thus, for the low band BBU 504, there is data stream DL MIMO A, which goes from the low band BBU 504 through the DRU 502 to a first remote unit 508. The DL MIMO A goes to an FPGA 512, and is sent through a digital-to-analog converter (DAC) 514 and amplifier 516 before transmission of a downlink signal from an antenna 518 in the first frequency band. Unlike the cRAN 300 of FIG. 3, the antenna for UL MIMO A is not immediately proximate the antenna 518. Rather, the closest antenna 520 corresponds to a low band DL MIMO B path, which is also transmitting a downlink signal in the first frequency band. Specifically, the DL MIMO B goes to the FPGA 512, and is sent through a DAC 522 and an amplifier 524 before transmission from the antenna 520. Because the antenna 520 is also a transmitting antenna, any signal from the antenna 518 is not likely to interfere with the signals on the antenna 520. In fact, rather than have any received low band signals at the first remote unit 508, the uplink paths are high band paths. Specifically, a high band uplink signal is received at an antenna 526 and passed through an amplifier 528 and an analog-to-digital converter (ADC) 530 to the FPGA 512 before being passed to the high band BBU 506 as UL MIMO A. Likewise, a second high band uplink signal is received at an antenna 532 and passed through an amplifier 534 and an ADC 536 to the FPGA 512 before being passed to the high band BBU 506 as UL MIMO B. Having low band signals from the antennas 518, 520 impinge on the antennas 526, 532 is readily addressed through relatively normal (and relatively inexpensive) filter techniques because of the spread between the high band and the low band frequencies.

Similarly, for the high band BBU 506, there is data stream DL MIMO A, which goes from the high band BBU 506 through the DRU 502 to a second remote unit 538. The DL MIMO A goes to an FPGA 540 and is sent through a DAC 542 and amplifier 544 before transmission from an antenna 546. Likewise, the DL MIMO B goes to the FPGA 540, and is sent through a DAC 548 and an amplifier 550 before transmission from an antenna 552. Because the antenna 552 is also a transmitting antenna, any signal from the antenna 546 is not likely to interfere with the signals on the antenna 552. Similar to the first remote unit 508, rather than have any received high band signals at the second remote unit 538, the uplink paths are low band paths. Specifically, a low band uplink signal is received at an antenna 554 and passed through an amplifier 556 and an ADC 558 to the FPGA 540 before being passed to the low band BBU 504 as UL MIMO A. Likewise, a second low band uplink signal is received at an antenna 560 and passed through an amplifier 562 and an ADC 564 to the FPGA 540 before being passed to the low band BBU 504 as UL MIMO B. Having high band signals from the antennas 546, 552 impinge on the antennas 554, 560 is readily addressed through relatively normal (and relatively inexpensive) filter techniques because of the spread between the high band and the low band frequencies.

Figure 6:
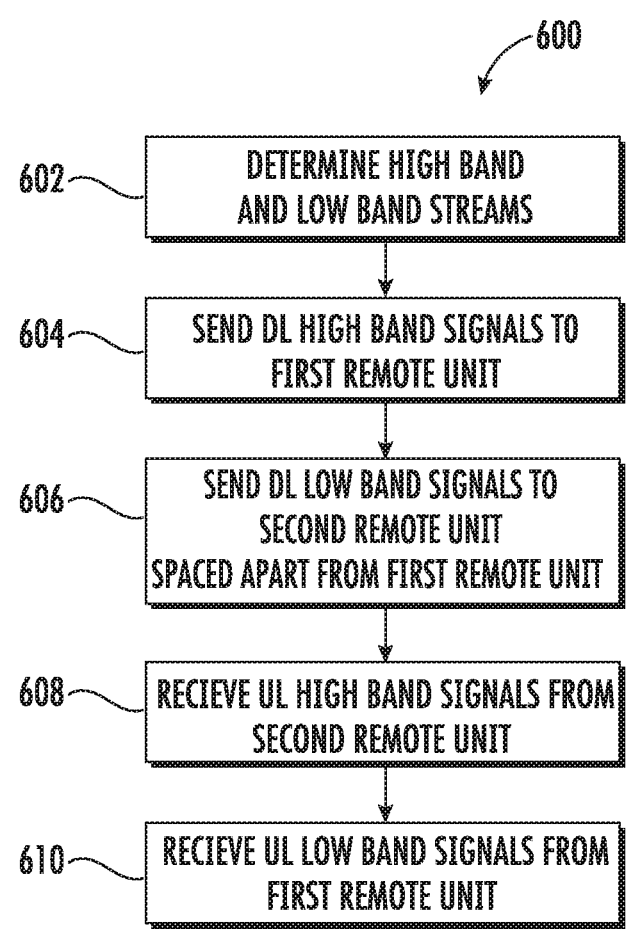
FIG. 6 is a flowchart illustrating a process of using the transceiver of FIG. 5.

As intimated by the discussion of FIG. 5, exemplary aspects of the present disclosure split the uplink and downlink signals at a particular band across different remote units to achieve physical separation that reduces or eliminates interference from the transmitting antennas. This process is summarized in the flowchart of process 600 set forth in FIG. 6. In particular, the process 600 starts by determining the high band and low band streams (block 602). The process 600 continues by sending downlink high band signals to a first remote unit (block 604) and sending downlink low band signals to a second remote unit spaced apart from the first remote unit (block 606). Likewise, the process 600 continues by receiving uplink high band signals from the second remote unit (block 608) and receiving uplink low band signals from the first remote unit (block 610).

Figure 7:
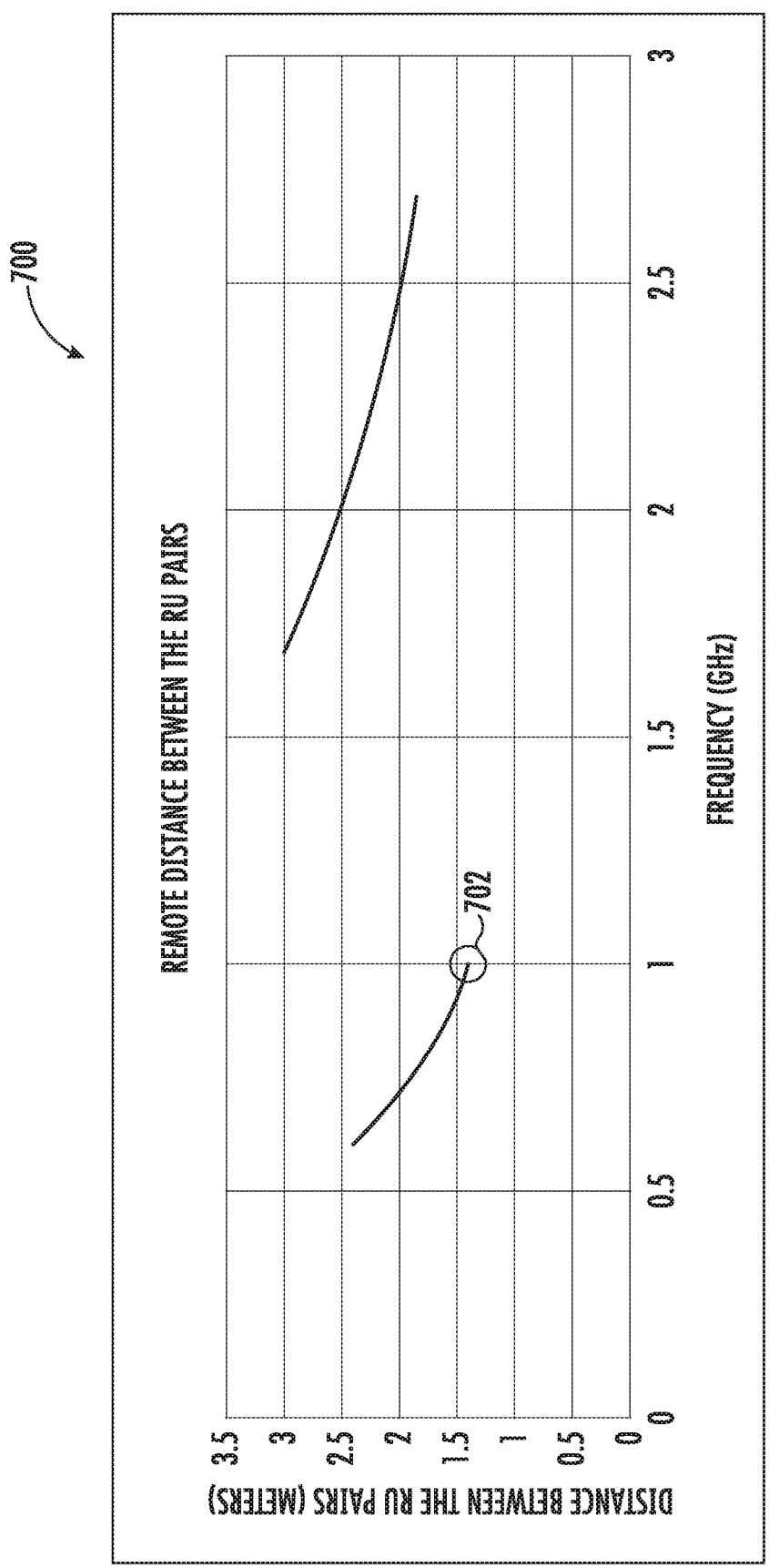
FIG. 7 is a graph that illustrates a distance required to achieve desired isolation versus frequency according to exemplary aspects of the present disclosure.

To further explicate what sort of spacing is sufficient, FIG. 7 provides a graph 700 that illustrates a distance (y-axis) in meters (m) versus frequency (x-axis) in gigahertz (GHz) recommended distance between remote unit pairs. Thus, for example, at one (1) GHz, a separation of under 1.5 m is appropriate as noted generally at point 702.

It should be appreciated that while the present disclosure has been presented in the context of a distributed communication system, it may be possible to scale the concepts herein to smaller scales. While the spacing of 1.5 m is impractical in a mobile terminal, it is possible that at different frequencies, aspects of the present disclosure are capable of being implemented in a mobile terminal.

Figure 8:
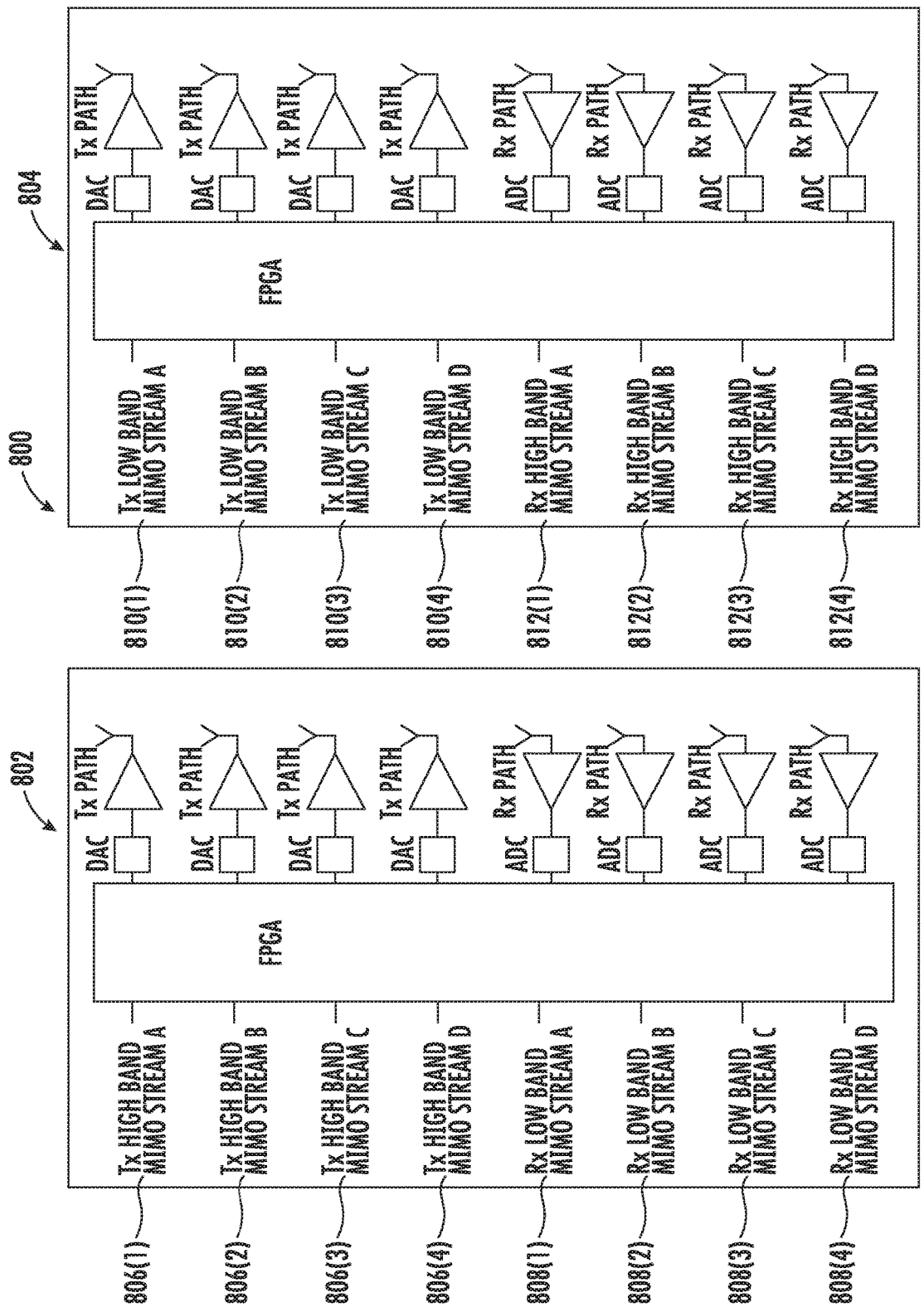
FIG. 8 is a schematic diagram of a dual-band transceiver where each band supports four MIMO streams.

Additionally, while the cRAN 500 is a dual-band, two stream, two remote unit system, it should be appreciated that the present disclosure can be scaled up to accommodate more streams as illustrated in FIG. 8 where a system 800 includes a first remote unit 802 and a second remote unit 804. In this example, there are four streams in a dual-band environment. All four high band transmit streams 806(1)-806(4) are present in the first remote unit 802 with the four low band receive streams 808(1)-808(4). Likewise, the four low band transmit streams 810(1)-810(4) and the four high band receive streams 812(1)-812(4) are present in the second remote unit 804.

Figure 9:
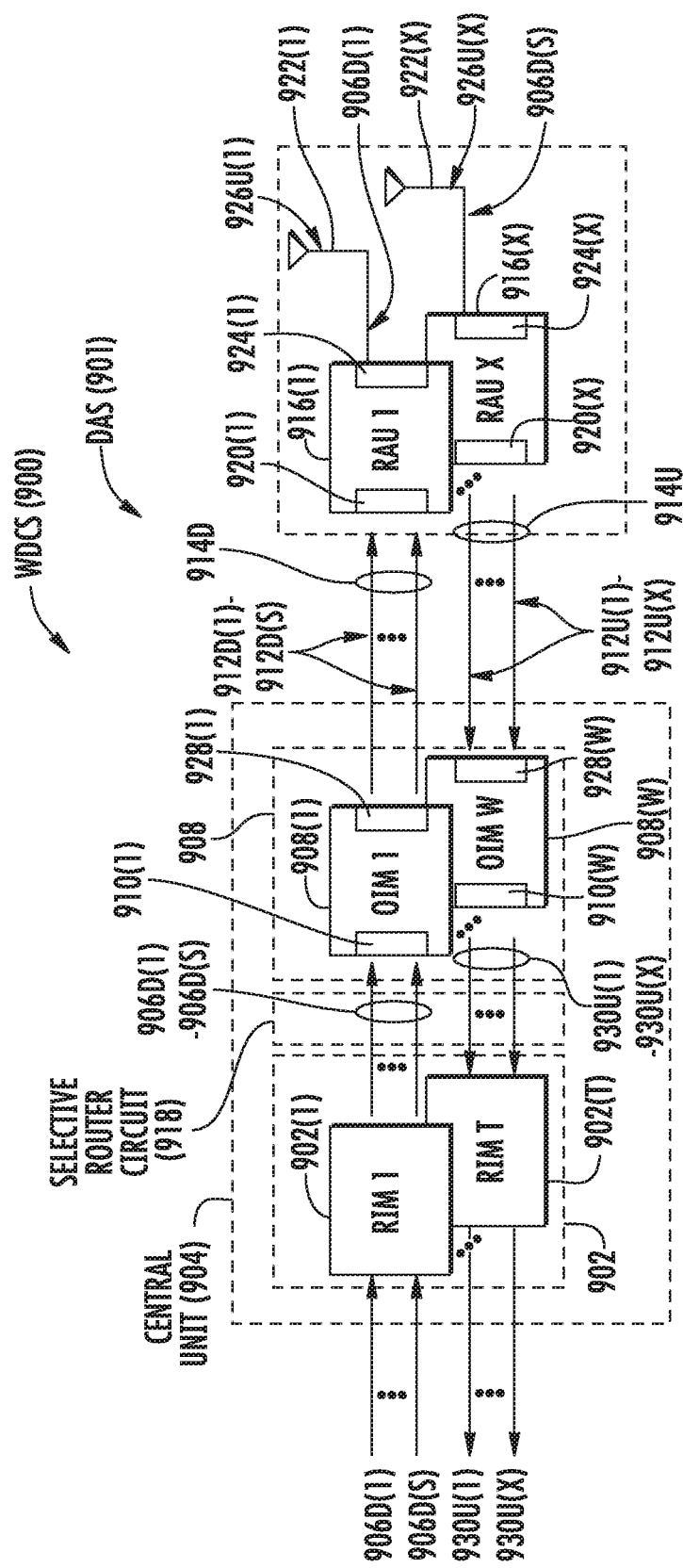
FIG. 9 is a schematic diagram of an exemplary non-contiguous wireless distributed communication system (WDCS) provided in the form of an optical fiber-based distributed antenna system (DAS)

FIG. 9 is a schematic diagram of an exemplary non-contiguous wireless distributed communication system (WDCS) 900 in the form of a non-contiguous distributed antenna system (DAS) 901. The DAS 901 in this example is an optical fiber-based DAS. The non-contiguous DAS 901 in this example is comprised of three (3) main components. One or more radio interfaces provided in the form of radio interface modules (RIMs) 902(1)-902(T) are provided in a central unit 904 to receive and process downlink electrical communication signals 906D(1)-906D(S) prior to optical conversion into downlink optical communication signals. The downlink electrical communication signals 906D(1)-906D(S) may be received from a base station (not shown) as an example. The downlink electrical communication signals 906D(1)-906D(S) can each include one or more subcarrier sets of a cell radio, wherein each subcarrier set is comprised of one or more subcarriers (e.g., radio channels). The RIMs 902(1)-902(T) provide both downlink and uplink interfaces for signal processing. The notations "1-S" and "1-T" indicate that any number of the referenced component, 1-S and 1-T, respectively, may be provided.

With continuing reference to FIG. 9, the central unit 904 is configured to accept the plurality of RIMs 902(1)-902(T) as modular components that can easily be installed and removed or replaced in the central unit 904. In one embodiment, the central unit 904 is configured to support up to twelve (12) RIMs 902(1)-902(12). Each RIM 902(1)-902(T) can be designed to support a particular type of radio source or range of radio sources (i.e., frequencies) to provide flexibility in configuring the central unit 904 and the non-contiguous DAS 901 to support the desired radio sources. For example, one RIM 902 may be configured to support the Personal Communication Services (PCS) radio band. Another RIM 902 may be configured to support the 700 MHz radio band. In this example, by inclusion of these RIMs 902, the central unit 904 could be configured to support and distribute communication signals, including those for the communication services and communication bands described above as examples.

The RIMs 902(1)-902(T) may be provided in the central unit 904 that support any frequencies desired, including, but not limited to, licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 9, the downlink electrical communication signals 906D(1)-906D(S) may be distributed to a plurality of optical interfaces provided in the form of optical interface modules (OIMs) 908(1)-908(W) in this embodiment to convert the unlicensed and/or licensed downlink electrical communication signals 906D(1)-906D(S). The notation "1-W" indicates that any number of the referenced component 1-W may be provided. The OIMs 908(1)-908(W) may be configured to provide one or more optical interface components (OICs) that contain optical-to-electrical (O-E) and electrical-to-optical (E-O) converters, as will be described in more detail below. The OIMs 908(1)-908(W) support the radio bands that can be provided by the RIMs 902(1)-902(T), including the examples previously described above.

The OIMs 908(1)-908(W) each include E-O converters 910(1)-910(W) to convert the downlink electrical communication signals 906D(1)-906D(S) into downlink optical communication signals 912D(1)-912D(S). The downlink optical communication signals 912D(1)-912D(S) are communicated over downlink optical fiber communication medium 914D to a plurality of remote units provided in the form of remote antenna units 916(1)-916(X). A selective router circuit 918 can be provided to selectively block certain subcarrier sets and/or subcarriers in the downlink optical communication signals 912D(1)-912D(S) distributed to the respective remote antenna units 916(1)-916(X) based on subcarriers associated with the respective remote antenna units 916(1)-916(X). The remote antenna units 916(1)-916(X) are arranged non-contiguously to each other based on their supported cell radio. The notation "1-X" indicates that any number of the referenced component 1-X may be provided. O-E converters 920(1)-920(X) provided in the remote antenna units 916(1)-916(X) convert the downlink optical communication signals 912D(1)-912D(S) back into the downlink electrical communication signals 906D(1)-906D(S), which are provided to antennas 922(1)-922(X) in the remote antenna units 916(1)-916(X) to user equipment (not shown) in the reception range of the antennas 922(1)-922(X).

E-O converters 924(1)-924(X) are also provided in the remote antenna units 916(1)-916(X) to convert uplink electrical communication signals 926U(1)-926U(X) received from user equipment (not shown) through the antennas 922(1)-922(X) into uplink optical communication signals 912U(1)-912U(X). The remote antenna units 916(1)-916(X) communicate the uplink optical communication signals 912U(1)-912U(X) over an uplink optical fiber communication medium 914U to the OIMs 908(1)-908(W) in the central unit 904. The OIMs 908(1)-908(W) include O-E converters 928(1)-928(W) that convert the received uplink optical communication signals 912U(1)-912U(X) into uplink electrical communication signals 930U(1)-930U(X), which are processed by the RIMs 902(1)-902(T) and provided as uplink electrical communication signals 930U(1)-930U(X). The central unit 904 may provide the uplink electrical communication signals 930U(1)-930U(X) to a source transceiver, such as a cell radio provided as base station or other communication system. The selective router circuit 918 may be configured to selectively block certain subcarrier sets and/or subcarriers in the uplink electrical communication signals 930U(1)-930U(X) distributed to the respective remote antenna units 916(1)-916(X) based on subcarriers associated with the respective remote antenna units 916(1)-916(X). Note that the downlink optical fiber communication medium 914D and uplink optical fiber communication medium 914U connected to each remote antenna unit 916(1)-916(X) may be a common optical fiber communication medium, wherein for example, wave division multiplexing (WDM) may be employed to provide the downlink optical communication signals 912D(1)-912D(S) and the uplink optical communication signals 912U(1)-912U(X) on the same optical fiber communications medium.

Figure 10A:
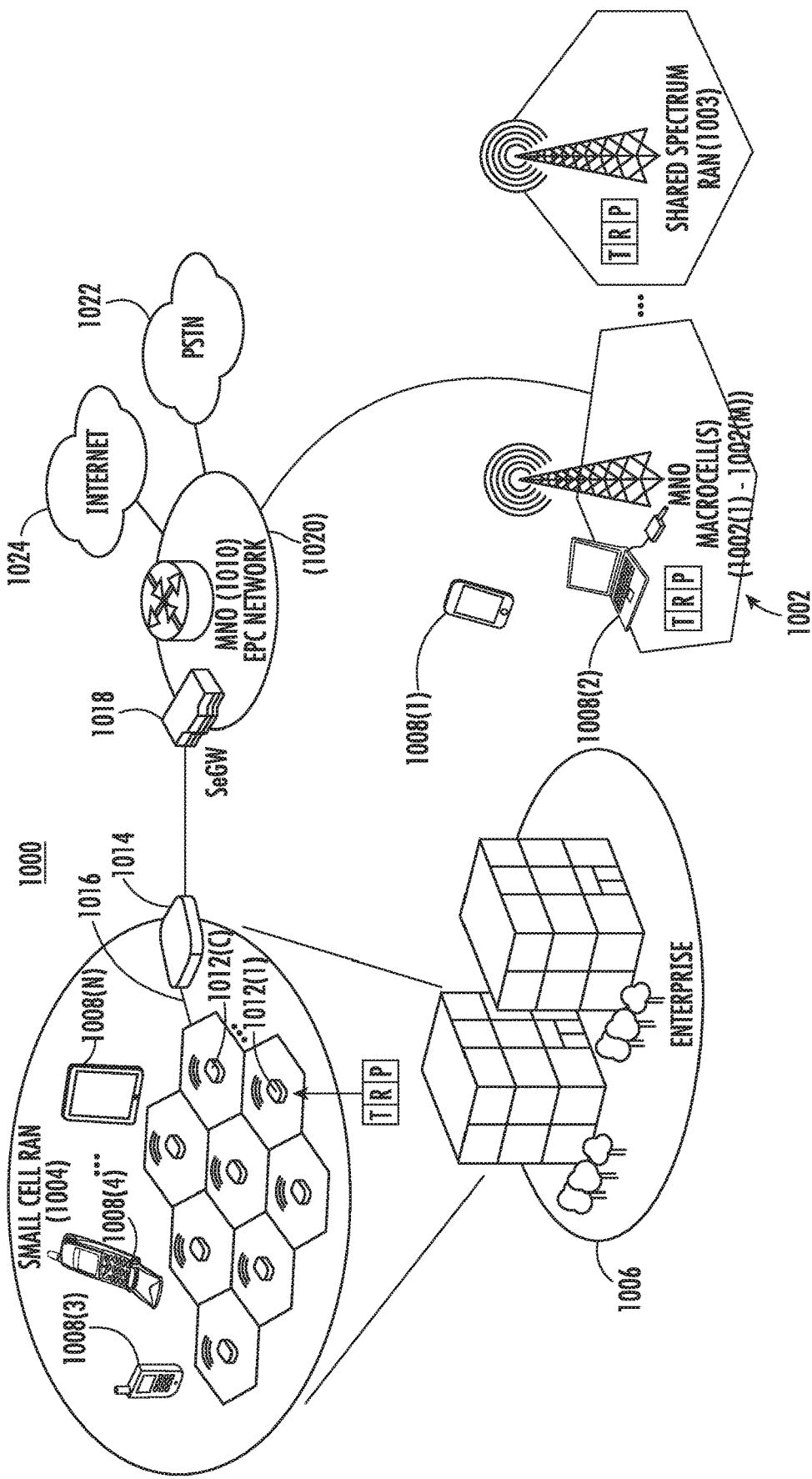
FIG. 10A is an exemplary mobile telecommunication environment that includes an exemplary microcell radio access network (RAN) and an exemplary small cell RAN.

FIG. 10A is a schematic diagram of an exemplary mobile telecommunication environment 1000 (also referred to as "environment 1000") that includes exemplary macrocell radio access networks (RANs) 1002(1)-1002(M) ("macrocells 1002(1)-1002(M)"), a shared spectrum RAN 1003, and an exemplary small cell RAN 1004 located within an enterprise environment 1006. The shared spectrum RAN 1003 (also referred to as "shared spectrum cell 1003") includes a macrocell in this example and supports communication on frequencies that are not solely licensed to a particular mobile network operator (MNO) and thus may service user equipment (UE) 1008(1)-1008(N), which are communication devices, independent of a particular MNO. The UEs 1008(1)-1008(N) may be mobile UEs (e.g., cellular phones or mobile devices) that can communicate wirelessly. For example, the shared spectrum cell 1003 may be operated by a third party that is not an MNO and wherein the shared spectrum cell 1003 supports citizens broadband radio service (CBRS) or unlicensed spectrum. The mobile telecommunication environment 1000 is configured to service mobile communication between a UE 1008(1)-1008(N) to a MNO 1010. When a macrocell 1002(1)-1002(M), shared spectrum RAN 1003, or small cell RAN 1004 services communication with a UE 1008(1)-1008(N), such macrocell 1002(1)-1002(M), shared spectrum RAN 1003, or small cell RAN 1004 is considered a "source RAN." A source RAN for a UE 1008(1)-1008(N) is a RAN or cell in the RAN in which the UEs 1008(1)-1008(N) have an established communication session with the exchange of mobile communication signals for mobile communication. Thus, a serving RAN may also be referred to herein as a serving cell. For example, the UEs 1008(3)-1008(N) in FIG. 10A are being serviced by the small cell RAN 1004, whereas UEs 1008(1), 1008(2) are being serviced by the macrocells 1002(1)-1002(M). The macrocells 1002(1)-1002(M) are MNO macrocells in this example. In this example, each of the macrocells 1002(1)-1002(M), shared spectrum RAN 1003, and small cell RAN 1004 include a transmitter circuit T configured to transmit a communication signal to a UE 1008(1)-1008(N) and a receiver circuit R configured to receive communication signals from the UE 1008(1)-1008(N). Each of the macrocells 1002(1)-1002(M), shared spectrum RAN 1003, and small cell RAN 1004 also include a processor circuit P (e.g., a microprocessor, micro-controller, other control circuit) communicatively coupled to the transmitter circuit T and the receiver circuit R for processing communication signals and performing other processing for signaling.

With continuing reference to FIG. 10A, the mobile telecommunication environment 1000 in this example is arranged as a Long Term Evolution (LTE) system as described by the Third Generation Partnership Project (3GPP) as an evolution of the standards Global System for Mobile communication/Universal Mobile Telecommunications System (GSM/UMTS). It is emphasized, however, that the aspects described herein may also be applicable to other network types and protocols. The mobile telecommunication environment 1000 includes the enterprise environment 1006 in which the small cell RAN 1004 is implemented. The small cell RAN 1004 includes a plurality of small cell radio nodes 1012(1)-1012(C). Each small cell radio node 1012(1)-1012(C) has a radio coverage area (graphically depicted in the drawings as a hexagonal shape) that is commonly termed a "small cell." A small cell may also be referred to as a femtocell, or using terminology defined by 3GPP as a Home Evolved Node B (HeNB). In the description that follows, the term "cell" typically means the combination of a radio node and its radio coverage area unless otherwise indicated.

The size of the enterprise environment 1006 and the number of cells deployed in the small cell RAN 1004 may vary. In typical implementations, the enterprise environment 1006 can be from 50,000 to 500,000 square feet and encompass multiple floors, and the small cell RAN 1004 may support hundreds to thousands of users using mobile communication platforms such as mobile phones, smartphones, tablet computing devices, and the like shown as the UEs 1008(3)-1008(N). However, the foregoing is intended to be illustrative and the solutions described herein can be typically expected to be readily scalable either upwards or downwards as the needs of a particular usage scenario demand.

In FIG. 10A, the small cell RAN 1004 includes one or more services nodes (represented as a single services node 1014 in FIG. 10A) that manage and control the small cell radio nodes 1012(1)-1012(C). In alternative implementations, the management and control functionality may be incorporated into a radio node, distributed among nodes, or implemented remotely (i.e., using infrastructure external to the small cell RAN 1004). The small cell radio nodes 1012(1)-1012(C) are coupled to the services node 1014 over a direct or local area network (LAN) connection 1016, as an example, typically using secure IPsec tunnels. The services node 1014 aggregates voice and data traffic from the small cell radio nodes 1012(1)-1012(C) and provides connectivity over an IPsec tunnel to a security gateway (SeGW) 1018 in an Evolved Packet Core (EPC) network 1020 of the MNO 1010. The EPC network 1020 is typically configured to communicate with a public switched telephone network (PSTN) 1022 to carry circuit-switched traffic, as well as for communicating with an external packet-switched network such as the Internet 1024.

The environment 1000 also generally includes an Evolved Node B (eNB) base station, or "macrocell" 1002. The radio coverage area of the macrocell 1002(1)-1002(M) is typically much larger than that of a small cell where the extent of coverage often depends on the base station configuration and surrounding geography. Thus, a given UE 1008(3)-1008(N) may achieve connectivity to the EPC network 1020 through either a macrocell 1002 or small cell radio node 1012(1)-1012(C) in the small cell RAN 1004 in the environment 1000.

A general principle in environment 1000 in FIG. 10A is that a serving RAN (e.g., an eNB in such system) provides a measurement configuration to the UEs 1008(1)-1008(N) to "point" the receiver of the UEs 1008(1)-1008(N) to find other systems (e.g., neighboring cells) transmitting at a specified frequency(ies) (e.g., at 1900 MHz, 2500 MHz) according to the measurement configuration that the UE 1008(1)-1008(N) should measure. The measurement of communication signals of other RANs by the UE 1008(1)-1008(N) at specified frequencies is performed for a variety of purposes, including inter-frequency mobility and inter-frequency measurements. The UE 1008(1)-1008(N) can find these communication systems and perform actions, such as cell selection in the idle mode and sending of measurement reports (e.g., Measurement Report Messages (MRMs)) in the active mode. These measurement reports can be used by the serving RAN (e.g., MNO macrocells 1002(1)-1002(M), shared spectrum cell 1003, small cell RAN 1004) to, for example, trigger handovers or to gather information about neighboring cells through Automatic Neighbor Relation (ANR) discovery. For example, the MNO macrocells 1002(1)-1002(M) may use the MRMs for cell reselection to cause a UE 1008(1)-1008(N) to be serviced by a different cell controlled by the MNO, such as the small cell RAN 1004 for example, for optimizing communication. This measurement report information is delivered in user mobile communication device-specific radio resource control signaling messages to serviced UEs 1008(1)-1008(N) that indicate to the UE 1008(1)-1008(N) the appropriate measurement configuration parameters. In these measurement configuration parameters, there are specific instructions about what frequencies the serviced UE 1008(1)-1008(N) should measure. The information measured by the UEs 1008(1)-1008(N) is then reported back to the serving RAN.

With continuing reference to FIG. 10A, the MNO macrocells 1002(1)-1002(M), the shared spectrum cell 1003, and the small cell RAN 1004 may be neighboring radio access systems to each other, meaning that some or all can be in proximity to each other such that a UE 1008(3)-1008(N) may be able to be in communication range of two or more of the MNO macrocells 1002(1)-1002(M), the shared spectrum cell 1003, and the small cell RAN 1004 depending on the location of UE 1008(3)-1008(N). If a UE 1008(1)-1008(N) serviced by the small cell RAN 1004 as a source RAN moves into the communication coverage area of a neighboring macrocell 1002(1)-1002(M), the source RAN, detecting a weaker communication signal from the UE 1008(1)-1008(N), initiates a handover command (i.e., request) to the neighboring macrocell 1002(1)-1002(M) as a "target RAN." The small cell RAN 1004 may be aware of the EARFCN of the MNO macrocells 1002(1)-1002(M) as part of its configuration or an ANR discovery process discussed above. Similarly, if a UE 1008(1)-1008(N) serviced by the shared spectrum cell 1003 as a source RAN moves into the communication coverage area of a neighboring macrocell 1002(1)-1002(M), the source RAN initiates a handover command (i.e., request) to the neighboring macrocell 1002(1)-1002(M) as a "target RAN." The target RAN has a target coverage area overlapping a source coverage area of the source RAN in this example. The shared spectrum cell 1003 may be aware of the EARFCN of the MNO macrocells 1002(1)-1002(M) as part of its configuration or an ANR process discussed above.

Figure 10B:
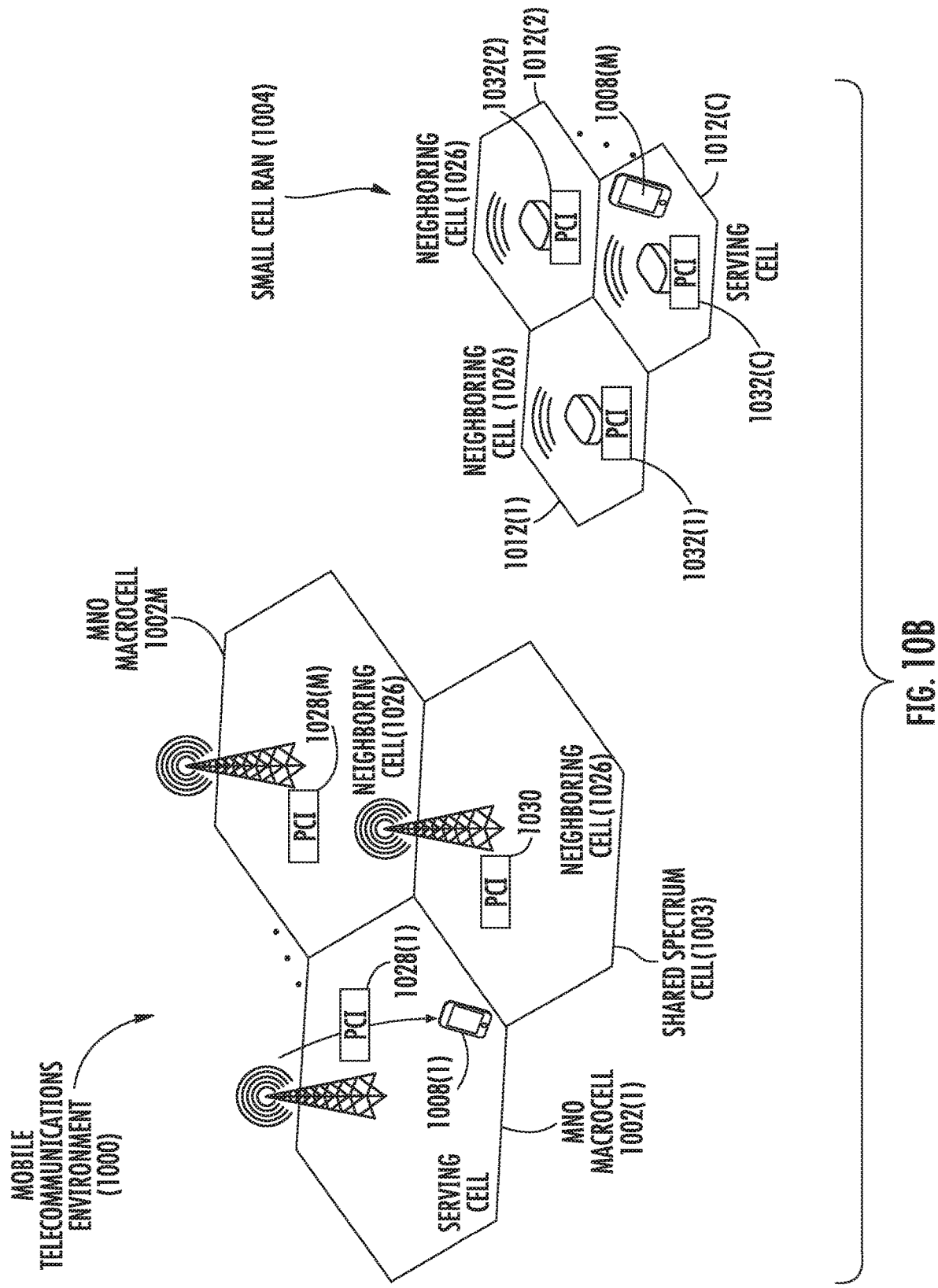
FIG. 10B illustrates small cells and neighboring macro cells within the mobile telecommunication environment in FIG. 10A.

A UE 1008 connected to the environment 1000 will actively or passively monitor a cell in a macrocell 1002(1)-1002(M) in an access network in the communication range of the UE 1008 as the UE 1008 moves throughout the environment 1000. As shown in FIG. 10B, such a cell is termed the "serving cell." For example, if a UE 1008 is in communication through an established communication session with a particular small cell radio node 1012(1)-1012(C) in the small cell RAN 1004, the particular small cell radio node 1012(1)-1012(C) will be the serving cell to the UE 1008, and the small cell RAN 1004 will be the serving RAN. The UE 1008 will continually evaluate the quality of a serving cell as compared with that of a neighboring cell 1026 in the small cell RAN 1004, MNO macrocells 1002, and/or the shared spectrum cell 1003, as shown in FIG. 10B. A neighboring cell 1026 is a cell among the small cell RAN 1004, MNO macrocells 1002, and/or the shared spectrum cell 1003 that is not in control of the active communication session for a given UE 1008, but is located in proximity to a serving cell to a UE 1008 such that the UE 1008 could be in communication range of both its serving cell and the neighboring cell 1026. Each of the small cell radio nodes 1012(1)-1012(C), the macrocells 1002(1)-1002(M), and the shared spectrum cell 1003 can identify themselves to a UE 1008 using a respective unique Physical Cell Identity (PCI) 1028(1)-1028(M), 1030, 1032(1)-1032(C) (e.g., a public land mobile network (PLMN) identification (ID) (PLMN ID)) that is transmitted over a downlink UE 1008. Each of the small cell radio nodes 1012(1)-1012(C), the MNO macrocells 1002(1)-1002(M), and the shared spectrum cell 1003 can assign a physical channel identity (PCI) that allows the UE 1008 to distinguish adjacent cells. As such, the PCIs 1028(1)-1028(M), 1030, 1032(1)-1032(C) are uniquely assigned among neighboring cells 1026, but can be reused across geographically separated cells.

Figure 11:
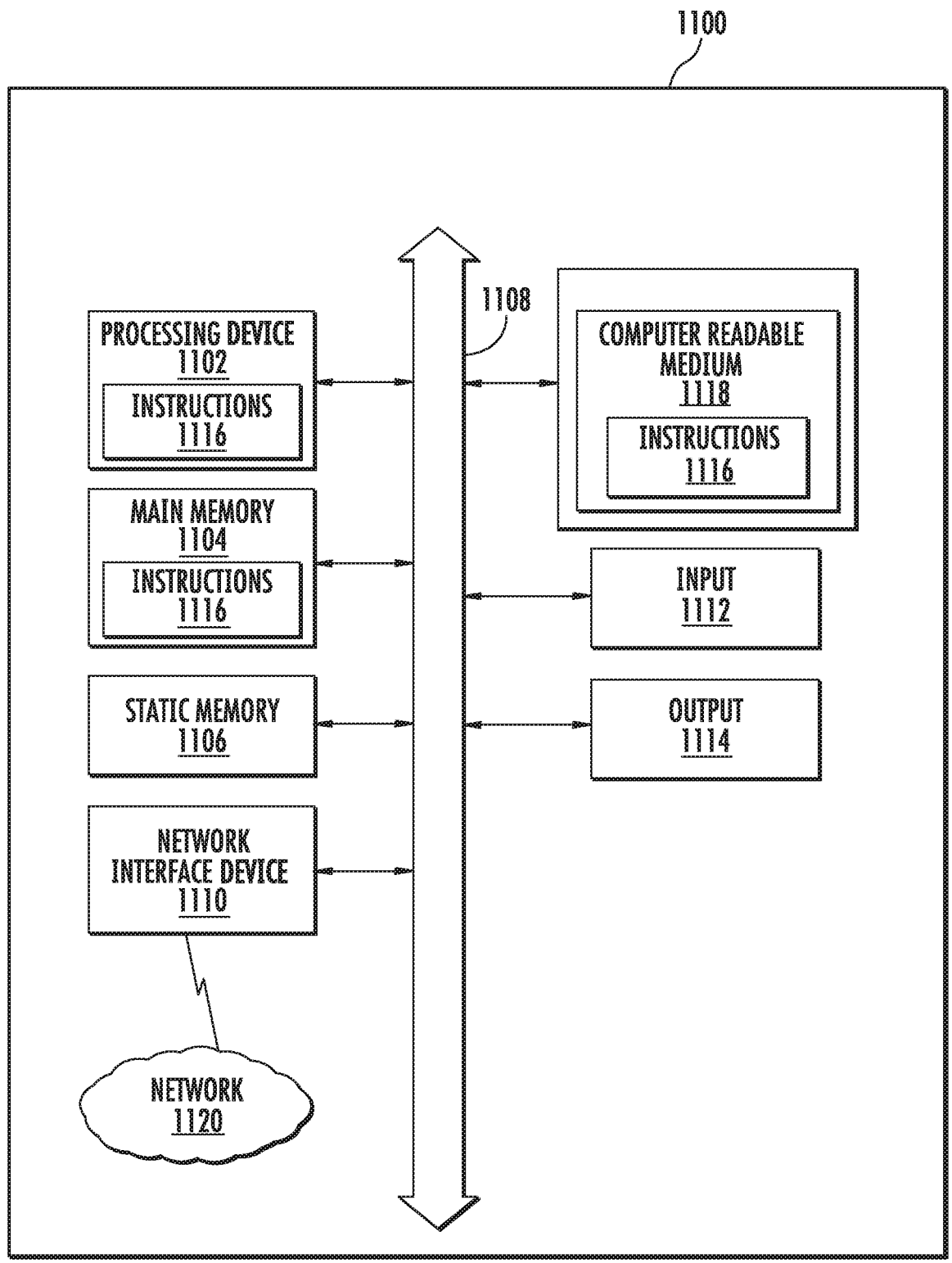
FIG. 11 is a schematic diagram of a generalized representation of an exemplary computer system, wherein the exemplary computer system is adapted to execute instructions from an exemplary computer-readable media.

FIG. 11 is a schematic diagram representation of additional detail regarding an exemplary computer system 1100. The exemplary computer system 1100 in this embodiment includes a processing device or processor 1102, a main memory 1104 (e.g., read-only memory (ROM), flash memory, dynamic random access memory (DRAM) such as synchronous DRAM (SDRAM), etc.), and a static memory 1106 (e.g., flash memory, static random access memory (SRAM), etc.), which may communicate with each other via the data bus 1108. Alternatively, the processing device 1102 may be connected to the main memory 1104 and/or static memory 1106 directly or via some other connectivity means. The processing device 1102 may be a controller, and the main memory 1104 or static memory 1106 may be any type of memory.

The processing device 1102 represents one or more general-purpose processing devices such as a microprocessor, central processing unit, or the like. More particularly, the processing device 1102 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 1102 is configured to execute processing logic in instructions 1116 for performing the operations and steps discussed herein.

The computer system 1100 may further include a network interface device 1110. The computer system 1100 also may or may not include an input 1112 to receive input and selections to be communicated to the computer system 1100 when executing instructions. The computer system 1100 also may or may not include an output 1114, including, but not limited to, a display, a video display unit (e.g., a liquid crystal display (LCD) or a cathode ray tube (CRT)), an alphanumeric input device (e.g., a keyboard), and/or a cursor control device (e.g., a mouse).

The computer system 1100 may or may not include a data storage device that includes instructions 1116 stored in a computer-readable medium 1118. The instructions 1116 may also reside, completely or at least partially, within the main memory 1104 and/or within the processing device 1102 during execution thereof by the computer system 1100, the main memory 1104 and the processing device 1102 also constituting computer-readable medium 1118. The instructions 1116 may further be transmitted or received over a network 1120 via the network interface device 1110.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A distributed communication system comprising:
a central unit;
a first remote unit coupled to the central unit through a first communication medium, the first remote unit comprising:
  a multiple input/multiple output (MIMO) antenna array, comprising:
    a first transmit antenna configured to transmit a first downlink signal in a first frequency band;
    a second transmit antenna configured to transmit a second downlink signal in the first frequency band;
    a first receive antenna configured to receive a first uplink signal in a second frequency band different than the first frequency band; and
    a second receive antenna configured to receive a second uplink signal in the second frequency band; and
a second remote unit coupled to the central unit through a second communication medium.

2. The distributed communication system of claim 1, wherein the first communication medium comprises an optical fiber.

3. The distributed communication system of claim 1, wherein the central unit comprises a digital routing unit (DRU).

4. The distributed communication system of claim 1, wherein the central unit is configured to communicate with at least one base band unit (BBU).

5. The distributed communication system of claim 1, wherein the second remote unit comprises:
a second MIMO antenna array, comprising:
  a third transmit antenna configured to transmit a third downlink signal in the second frequency band;
  a fourth transmit antenna configured to transmit a fourth downlink signal in the second frequency band;
  a third receive antenna configured to receive a third uplink signal in the first frequency band; and
  a fourth receive antenna configured to receive a fourth uplink signal in the first frequency band.

6. The distributed communication system of claim 1, wherein the first remote unit further comprises an amplifier and a digital-to-analog converter associated with the first transmit antenna.

7. The distributed communication system of claim 1, wherein the first remote unit further comprises an amplifier and an analog-to-digital converter associated with the first receive antenna.

8. The distributed communication system of claim 1, wherein the first remote unit is spaced apart from the second remote unit.

9. The distributed communication system of claim 1, wherein the first remote unit further comprises a plurality of additional transmit antennas.

10. The distributed communication system of claim 1, wherein the first remote unit further comprises a plurality of additional receive antennas.

11. A remote unit comprising:
a multiple input/multiple output (MIMO) antenna array, comprising:
  a first transmit antenna configured to transmit a first downlink signal in a first frequency band;
  a second transmit antenna configured to transmit a second downlink signal in the first frequency band;
  a first receive antenna configured to receive a first uplink signal in a second frequency band different than the first frequency band; and
  a second receive antenna configured to receive a second uplink signal in the second frequency band.

12. The remote unit of claim 11, further comprising an amplifier and a digital-to-analog converter associated with the first transmit antenna.

13. The remote unit of claim 11, further comprising an amplifier and an analog-to-digital converter associated with the first receive antenna.

14. A method for communicating with wireless mobile terminals through a distributed communication system comprising:
routing a first downlink signal in a first frequency band to a first remote unit;
routing a second downlink signal in a second frequency band to a second remote unit;
receiving a first uplink signal in the first frequency band at the second remote unit; and
receiving a second uplink signal in the second frequency band at the first remote unit,
wherein
routing the first downlink signal in the first frequency band to the first remote unit comprises not routing any downlink signals in the first frequency band to the second remote unit; and
routing the second downlink signal in the second frequency band to the second remote unit comprises not routing any downlink signals in the second frequency band to the first remote unit.

15. The method of claim 14, wherein the first frequency band is a high band frequency band relative to the second frequency band.

16. The method of claim 14, wherein the second frequency band is a low band frequency band relative to the first frequency band.

17. The method of claim 14, further comprising communicating with the first and second remote units through a digital routing unit (DRU).

18. The method of claim 14, further comprising communicating across multiple streams in the first frequency band.

19. The method of claim 14, further comprising passing the first uplink signal to a baseband unit.

20. A method for communicating with wireless mobile terminals through a distributed communication system comprising:
- routing a first downlink signal in a first frequency band to a first transmit antenna in a first remote unit;
- routing a second downlink signal in the first frequency band to a second transmit antenna in the first remote unit;
- receiving a first uplink signal in a second frequency band at a first receive antenna in the first remote unit; and
- receiving a second uplink signal in the second frequency band at a second receive antenna in the first remote unit.

21. The method of claim 20, wherein the first frequency band is a high band frequency band relative to the second frequency band, and the second frequency band is a low band frequency band relative to the first frequency band.

* * * * *

UNITED STATES PATENT AND TRADEMARK OFFICE
CERTIFICATE OF CORRECTION

PATENT NO. : 10,756,786 B1
APPLICATION NO. : 16/399055
DATED : August 25, 2020
INVENTOR(S) : Dror Ben-Shlomo It is certified that error appears in the above-identified patent and that said Letters Patent is hereby corrected as shown below:

In the Specification

On Column 16, Line 11, delete "distributed antenna"

Signed and Sealed this
Twenty-seventh Day of September, 2022

*Katherine Kelly Vidal*
Katherine Kelly Vidal
*Director of the United States Patent and Trademark Office*